United States Patent
Yi et al.

(10) Patent No.: US 10,553,116 B2
(45) Date of Patent: Feb. 4, 2020

(54) METHOD FOR DETECTING RIGHT LANE AREA AND LEFT LANE AREA OF REAR OF VEHICLE USING REGION OF INTEREST AND IMAGE MONITORING SYSTEM FOR VEHICLE USING THE SAME

(71) Applicant: CENTER FOR INTEGRATED SMART SENSORS FOUNDATION, Daejeon (KR)

(72) Inventors: Kang Yi, Pohang-si (KR); Kyeong Hoon Jung, Seoul (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 419 days.

(21) Appl. No.: 15/191,878

(22) Filed: Jun. 24, 2016

(65) Prior Publication Data
US 2017/0132932 A1     May 11, 2017

(30) Foreign Application Priority Data

Jul. 3, 2015   (KR) .................. 10-2015-0095173

(51) Int. Cl.
*G08G 1/16*     (2006.01)
*H04N 7/18*     (2006.01)
(Continued)

(52) U.S. Cl.
CPC ......... *G08G 1/167* (2013.01); *G06K 9/00798* (2013.01); *G06K 9/00805* (2013.01);
(Continued)

(58) Field of Classification Search
CPC .. G08G 1/167; G06T 7/30; G06T 7/74; G06T 2207/10016; G06T 2207/30256; G06T 2207/30261; G06T 2207/30264; G06K 9/00798; G06K 9/00805; G06K 9/4604; H04N 5/23245; H04N 5/907; H04N 7/183
See application file for complete search history.

(56) References Cited

U.S. PATENT DOCUMENTS

2008/0136612 A1* 6/2008 Machii .................. G01S 11/12
                                                    340/435
2008/0309516 A1* 12/2008 Friedrichs .......... G06K 9/00805
                                                    340/935

(Continued)

*Primary Examiner* — Joseph G Ustaris
*Assistant Examiner* — Jill D Sechser
(74) *Attorney, Agent, or Firm* — Peter A. Sullivan; Erik A. Huestis; Foley Hoag LLP (57) ABSTRACT

An image monitoring system for vehicle for detecting a left lane area and a right lane area behind a vehicle using a region of interest (ROI) is provided. The system includes a rear camera, a memory configured to store an image obtained from the rear camera, and a controller configured to be set to one of a driving mode and a parking mode based on whether the vehicle is traveling and to detect an event from the image obtained from the rear camera. The controller set to the driving mode sets the ROI corresponding to the left lane area and the right lane area behind the vehicle on the image obtained from the rear camera, while the vehicle is traveling, detects whether an object is located on or enters the ROI, and notifies a driver of the vehicle of the detected result using an alarm.

12 Claims, 7 Drawing Sheets

(51) Int. Cl.
   *H04N 5/907* (2006.01)
   *G06K 9/00* (2006.01)
   *G06K 9/46* (2006.01)
   *H04N 5/232* (2006.01)

(52) U.S. Cl.
   CPC ....... *G06K 9/4604* (2013.01); *H04N 5/23245* (2013.01); *H04N 5/907* (2013.01); *H04N 7/183* (2013.01); *G06T 2207/30256* (2013.01); *G06T 2207/30261* (2013.01); *G06T 2207/30264* (2013.01)

(56) References Cited

U.S. PATENT DOCUMENTS

| | | | |
|---|---|---|---|
| 2009/0243822 A1* | 10/2009 | Hinninger | B60Q 9/008 340/435 |
| 2011/0025845 A1* | 2/2011 | Han | G06T 7/73 348/140 |
| 2011/0115615 A1* | 5/2011 | Luo | B60R 1/00 340/436 |
| 2012/0140072 A1* | 6/2012 | Murashita | G06K 9/00805 348/148 |
| 2013/0335569 A1* | 12/2013 | Einecke | G01S 13/867 348/148 |
| 2014/0313339 A1* | 10/2014 | Diessner | H04N 7/18 348/148 |
| 2015/0343951 A1* | 12/2015 | Kim | B60R 1/00 701/42 |
| 2015/0360612 A1* | 12/2015 | Lee | B60R 1/00 348/148 |
| 2015/0371095 A1* | 12/2015 | Hartmann | G06K 9/00791 348/148 |
| 2016/0252610 A1* | 9/2016 | Smith | G01S 13/931 342/27 |
| 2016/0339959 A1* | 11/2016 | Lee | B62D 15/0265 |

* cited by examiner

METHOD FOR DETECTING RIGHT LANE AREA AND LEFT LANE AREA OF REAR OF VEHICLE USING REGION OF INTEREST AND IMAGE MONITORING SYSTEM FOR VEHICLE USING THE SAME

BACKGROUND

Embodiments of the inventive concepts described herein relate to technologies for a method for detecting a left lane area and a right lane area behind a vehicle in an image monitoring system for vehicle, and more particularly, to technologies for detecting whether an object is located on or enters regions of interest (ROIs) corresponding to the left lane area and the right lane area behind the vehicle on an image obtained from a rear cameral included in the image monitoring system for vehicle, installed in the vehicle which is traveling.

A rearview mirror and side mirrors for securing view of a driver for the side and rear of a typical vehicle are installed in the vehicle. However, if a driver of the vehicle uses only the rearview mirror and the side mirrors, there are blind spots on the view of the driver for the side and rear of the vehicle. Herein, the blind spots of the vehicle may refer to regions located at an angle where an object is not shown by the driver of the vehicle and may be generated due to structural characteristics of the vehicle, the rearview mirror, and the side mirrors.

The absence of the view of the driver for a left lane area and a right lane area behind the vehicle among the blind spots of the vehicles is a principle cause of an accident of the vehicle. To detect an object located on the left lane area and the right lane area behind the vehicle, the driver of the vehicle should turn his or her head to change his or her view.

Therefore, in the specification, a technology of detecting a left lane area and a right lane area behind a vehicle using an image monitoring system for vehicle, installed in a vehicle, is proposed.

SUMMARY

Embodiments of the inventive concepts provide a method, an apparatus, and a system for detecting whether an object is located on or enters ROIs corresponding to a left lane area and a right lane area behind a vehicle, from an image obtained from a rear camera included in an image monitoring system for vehicle, installed in the vehicle.

Embodiments of the inventive concepts provide a method, an apparatus, and a system for detecting whether an object is located on an ROI by extracting a feature from the ROI using various feature extraction techniques and identifying the object using various object identification techniques.

Embodiments of the inventive concepts provide a method, an apparatus, and a system for recognizing a change of appearance information or identification information of an object or detecting whether an object enters an ROI by estimating a motion vector of the object.

Embodiments of the inventive concepts provide a method, an apparatus, and a system for optionally performing operations of detecting whether an object is located on or enters an ROI.

One aspect of embodiments of the inventive concept is directed to provide an image monitoring system for vehicle for detecting a left lane area and a right lane area behind a vehicle using an ROI. The system may include a rear camera, a memory configured to store an image obtained from the rear camera, and a controller configured to be set to one of a driving mode and a parking mode based on whether the vehicle is traveling and to detect an event from the image obtained from the rear camera. The controller set to the driving mode may set the ROI corresponding to the left lane area and the right lane area behind the vehicle on the image obtained from the rear camera, while the vehicle is traveling, may detect whether an object is located on or enters the ROI, and may notify a driver of the vehicle of the detected result using an alarm.

The controller set to the driving mode may set the ROI based on left lane information and right lane information detected from the image obtained from the rear camera.

The controller set to the driving mode may determine the ROI in at least one of location, form, size, or number using shadow information of the object.

The controller set to the driving mode may calculate blind spots of side mirrors and a rearview mirror of the vehicle between the left lane area and the right lane area behind the vehicle based on the left lane information and the right lane information detected from the image obtained from the rear camera and location information of a vanishing point on the image obtained from the rear camera and may set a region including the calculated blind spots to the ROI.

The controller set to the driving mode may detect whether the object is located on the ROI by extracting a feature from the ROI using at least one of a histogram of gradients (HOG) technique or an Haar-like feature technique and identifying the object using at least one of a support vector machine (SVM) technique, an Adaboost technique, or an artificial neural network (ANN) technique.

The controller set to the driving mode may set parameters used for the HOG technique based on appearance information previously constructed for each of a plurality of objects including the object, if using the HOG technique.

The controller set to the driving mode may recognize a change of appearance information or identification information of the object, or may detect whether the object enters the ROI or whether the object is traveling at the same speed as the vehicle on the ROI by calculating a motion vector of the object.

The controller set to the driving mode may recognize the change of the appearance information or the identification information of the object or may detect whether the object departs from the ROI by calculating the motion vector of the object, if the object is located on the ROI.

The controller set to the driving mode may detects whether the object is located on or enters one of a first area of a distance or more from the vehicle, which is not recognized by the driver through side mirrors of the vehicle and is captured by the rear camera, a second area of less than the distance from the vehicle, which is not recognized by the driver through the side mirrors and is captured by the rear camera, or a third area which is not recognized by the driver through the side mirrors and is not captured by the rear camera.

The controller set to the driving mode may recognize a change of appearance information or identification information of the object or may detect whether the object enters the third area by calculating a motion vector of the object, if the object is located on the second area in the ROI.

After detecting that the object enters the third area and notifying the driver of the vehicle of the detected result using the alarm, the controller set to the driving mode may clear the alarm, if detecting that the object departs from the third area.

The controller set to the driving mode may detect that the object departs from the third area, using an image obtained from a front camera included in the image monitoring system for vehicle or the image obtained from the rear camera.

The ROI may be set in at least one of location, form, size, or number based on at least one of left lane information and right lane information detected from the image obtained from the rear camera, location information of a vanishing point on the image obtained from the rear camera, appearance information of the object located on the image obtained from the rear camera, a speed calculated by the controller, or power consumed by the controller.

The controller set to the driving mode may detect whether the object is located on or enters the ROI for each frame or at intervals of a time, while the vehicle is traveling.

The controller set to the driving mode may notify the driver of the vehicle of the detected result using the alarm through at least one of a display device or an audio device installed in the vehicle.

Another aspect of embodiments of the inventive concept is directed to provide a method for detecting a left lane area and a right lane area behind a vehicle using an ROI in an image monitoring system for vehicle. The method may include setting a controller included in the image monitoring system for vehicle to one of a driving mode and a parking mode based on whether the vehicle is traveling, storing an image, obtained from a rear camera included in the image monitoring system for vehicle, in a memory included in the image monitoring system for vehicle, and detecting an event from the image obtained from the rear camera, using the controller. The detecting of the event from the image obtained from the rear camera may include detecting whether an object is located on or enters the ROI corresponding to the left lane area and the right lane area behind the vehicle on the image obtained from the rear camera, while the vehicle is traveling, using the controller set to the driving mode and notifying a driver of the vehicle of the detected result using an alarm.

The detecting whether the object is located on or enters the ROI may include setting the ROI based on left lane information and right lane information detected from the image obtained from the rear camera.

The setting of the ROI may include determining the ROI in at least one of location, form, size, or number using shadow information of the object.

The detecting whether the object is located on or enters the ROI may include detecting whether the object is located on the ROI by extracting a feature from the ROI using at least one of a histogram of gradients (HOG) technique or an Haar-like feature technique and identifying the object using at least one of a support vector machine (SVM) technique, an Adaboost technique, or an artificial neural network (ANN) technique.

The detecting whether the object is located on or enters the ROI may include recognizing a change of appearance information or identification information of the object, or detecting whether the object enters the ROI or whether the object is traveling at the same speed as the vehicle on the ROI by calculating a motion vector of the object.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, a description will be given in detail of exemplary embodiments of the inventive concept with reference to the accompanying drawings. However, the inventive concept should not be construed as being limited only to the illustrated embodiments. Further, the same reference numerals illustrated in each drawing denote the same members.

Figure 1:
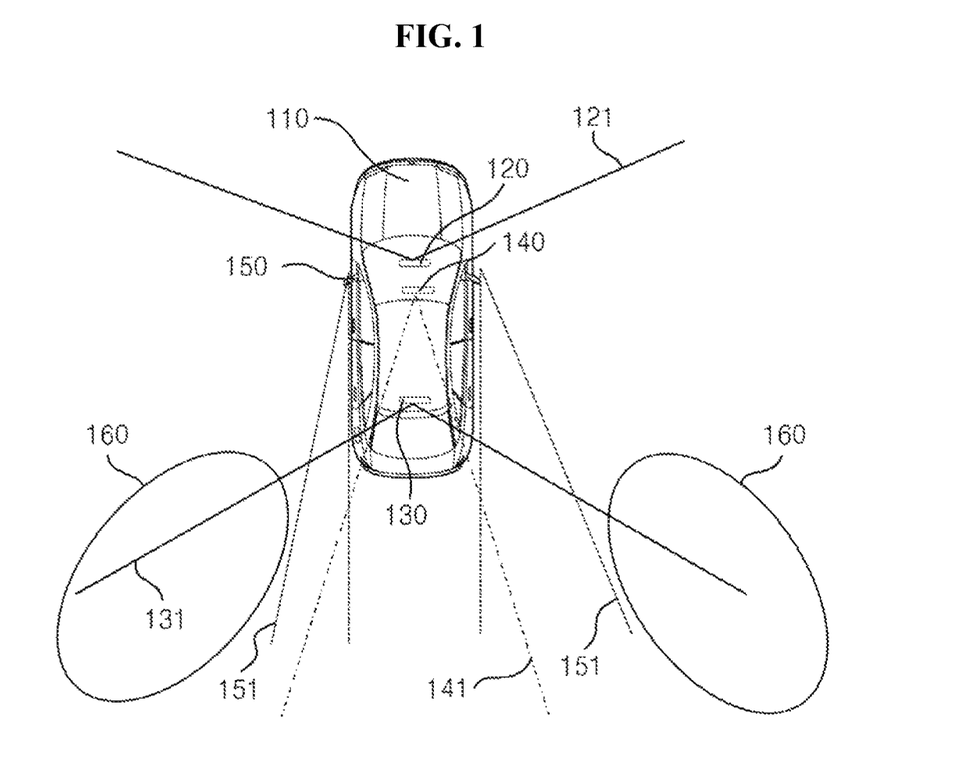
FIG. 1 is a drawing illustrating an image monitoring system for vehicle for detecting a left lane area and a right lane area behind a vehicle using a region of interest (ROI) according to an exemplary embodiment of the inventive concept.

FIG. 1 is a drawing illustrating an image monitoring system for vehicle for detecting a left lane area and a right lane area behind a vehicle using an ROI according to an exemplary embodiment of the inventive concept.

Referring to FIG. 1, the image monitoring system for vehicle according to an exemplary embodiment of the inventive concept may be installed in a vehicle 110. Herein, the image monitoring system for vehicle may include a front camera 120, a rear camera 130, a memory (not shown), and a controller (not shown). In FIG. 1, an exemplary embodiment of inventive concept is exemplified as the memory and the controller are not shown to be combined and configured with one of the front camera 120 and the rear camera 130. Embodiments of the inventive concept are not limited thereto. For example, the memory and the controller may be independent of the front camera 120 and the rear camera 130. Also, the rear camera 130 should be included in the image monitoring system for vehicle, but the front camera 120 may be optionally included in the image monitoring system for vehicle. In this case, the rear camera 130 may be a monocular camera.

The front camera 120 may obtain an image of a view 121 based on an angle preset toward the front of the vehicle 110. In this case, the front camera 120 may optionally obtain a high-quality image or a low-quality image based on a mode of the controller.

Also, the rear camera 130 may obtain an image of a view 131 based on an angle preset towards the rear of the vehicle 110. In this case, also, the rear camera 130 may selectively obtain a high-quality image or a low-quality image based on a mode of the controller.

For example, if the controller is set to a driving mode, each of the front camera 120 and the rear camera 130 may obtain a high-quality image of an image quality or more. If the controller is set to a parking mode, the each of the front camera 120 and the rear camera 130 may obtain a low-quality image of less than the image quality. Therefore, each of the front camera 120 and the rear camera 130 may minimize power consumed in the process of obtaining the image by selectively adjusting an image quality of the obtained image. As such, the image obtained from each of the front camera 120 and the rear camera 130 may be stored in the memory.

The controller may be set to one of the driving mode or the parking mode based on whether the vehicle 110 is traveling and may detect an event from the image obtained from each of the front camera 120 and the rear camera 130. In this case, the controller may detect an event from the image obtained from each of the front camera 120 and the rear camera 130 for each frame or at intervals of a time.

Herein, a typical technology of detecting an event may be used for the operation of detecting the event from the image obtained from each of the front camera 120 and the rear camera 130. A detailed description of this will be omitted because of departing from embodiments of the inventive concept.

In general, there may be blind spots 160 for a left lane area and a right lane area behind the vehicle 110 due to only the view 141 of a driver who uses a rearview mirror 140 installed on the vehicle 110 and only the view 151 of the driver who uses side mirrors 150. Therefore, if the controller is set to the driving mode, the image monitoring system for vehicle according to an exemplary embodiment of the inventive concept may verify a left lane area and a right lane area behind the vehicle 110, which are the blind spots 160 of the vehicle 110, by detecting whether an object is located on or enters ROIs corresponding to the left lane area and the right lane area behind the vehicle 110, which are the blind spots 160 of the vehicle 110, from the image obtained from the rear camera 120, while the vehicle 110 is traveling. A detailed description of this will be described with reference to FIGS. 2A and 2B.

Figure 2A:
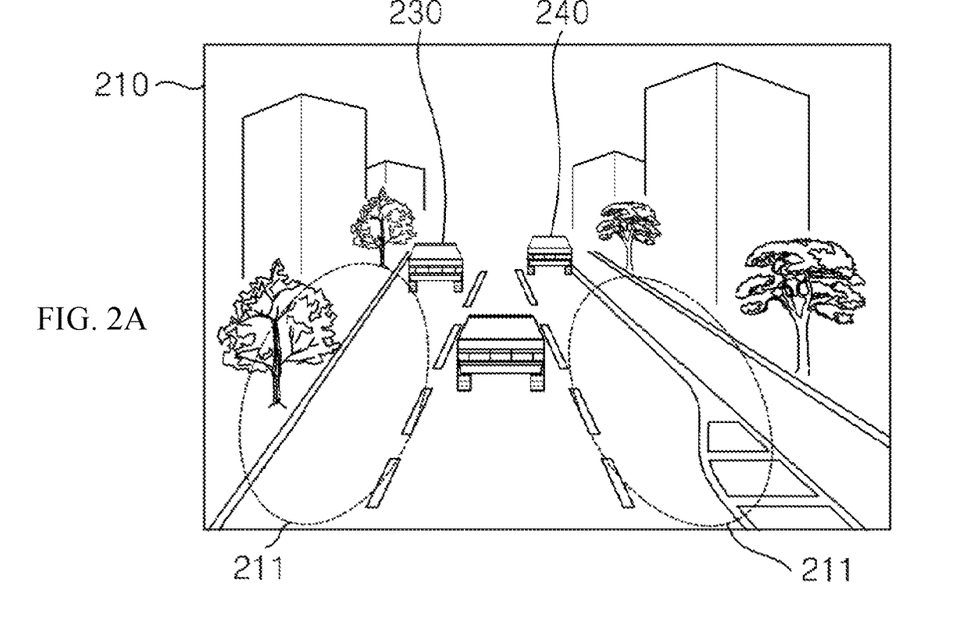
FIGS. 2A and 2B are drawings illustrating images obtained from a rear camera to describe a method for detecting a left lane area and a right lane area behind a vehicle using an ROI according to an exemplary embodiment of the inventive concept.
Figure 2B:
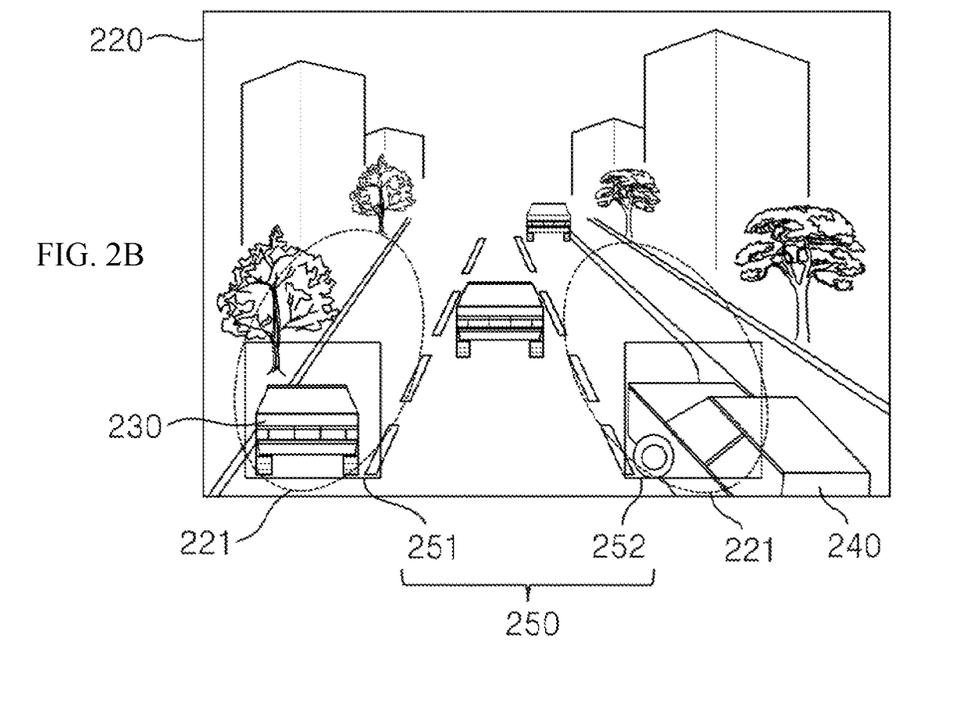

FIGS. 2A and 2B are drawings illustrating images obtained from a rear camera to describe a method for detecting a left lane area and a right lane area behind a vehicle using an ROI according to an exemplary embodiment of the inventive concept.

Referring to FIGS. 2A and 2B, a rear camera included in an image monitoring system for vehicle according to an exemplary embodiment of the inventive concept may obtain images 210 and 220 of views based on an angle preset towards the rear of a vehicle under control of a controller set to a driving mode.

Therefore, the controller set to the driving mode may detect whether objects 230 and 240 are respectively located on or enter a left lane area 211 or 221 and a right lane area 211 or 221 behind the vehicle, from the images 210 and 220 obtained from the rear camera while the vehicle is traveling.

In this case, to detect whether the objects 230 and 240 are respectively located on or enter the left lane area 211 or 221 and the right lane area 211 or 221 behind the vehicle, the controller set to the driving mode may activate a function of detecting an ROI 250 corresponding to the left lane area 211 or 221 and the right lane area 211 or 221 behind the vehicle from the images 210 and 220 obtained from the rear camera.

Herein, the ROI 250 may be a region fixed to at least part of the left lane area 211 or 221 and the right lane area 211 or 221 behind the vehicle and may be set based on left lane information and right lane information detected from the images 210 and 220 obtained from the rear camera.

For example, the controller set to the driving mode may calculate blind spots of side mirrors and a rearview mirror of the vehicle between the left lane area 211 or 221 and the right lane area 211 or 221 behind the vehicle based on the left lane information and the right lane information detected from the images 210 and 220 obtained from the rear camera and location information of a vanishing point on the images 210 and 220 obtained from the rear camera and may set a region including the calculated blind spots to the ROI 250. Also, the ROI 250 may be determined in at least one of location, form, size, or number using shadow information of the objects 230 and 240.

In detail, for example, if a shadow of an object is not found from the images 210 and 220 obtained from the rear camera, the controller set to the driving mode may not set the ROI 250. The controller set to the driving mode may set the ROI 250 to a minimum size based on a form and a brightness distribution of a shadow of an object or may dynamically determine a location of the ROI 250 to accurately detect the object.

The controller set to the driving mode may activate a function of detecting the ROI 250 and may detect whether the objects 230 and 240 are located on or enter the ROI 250. Therefore, since detecting the objects 230 and 240 on only the ROI 250 which is a region fixed to at least part of the left lane area 211 and the right lane area 221 behind the vehicle from the images 210 and 220 obtained from the rear camera, the controller set to the driving mode may remarkably reduce an amount of calculation for detecting the objects 230 and 240 compared with a technology of tracing and detecting the objects 230 and 240 with respect to all of the left lane area 211 and the right lane area 221 behind the vehicle.

In detail, the controller set to the driving mode may extract a feature from the ROI 250 using at least one of the histogram of gradients (HOG) technique or the Haar-like feature technique based on the function of detecting the activated ROI 250. The controller set to the driving mode may identify the objects 230 and 240 using at least one of the support vector machine (SVM) technique, the Adaboost technique, or the artificial neural network (ANN) technique based on the function of detecting the activated ROI 250. Therefore, the controller set to the driving mode may detect whether the objects 230 and 240 are located on the ROI 250. Hereinafter, a detailed description for the HOG technique, the SVM technique, the Haar-like feature technique, the Adaboost technique, and the ANN technique will be omitted because of departing from embodiments of the inventive concept.

Also, the controller set to the driving mode may recognize a change of appearance information and identification information of the objects 230 and 240 based on the function of detecting the activated ROI 250, or may detect whether the objects 230 and 240 enter the ROI 250 or whether the objects 230 and 240 are traveling at the same speed as the vehicle on the ROI 250 by calculating motion vectors of the objects 230 and 240 based on the function of detecting the activated ROI 250. In this case, the process of calculating the motion vectors of the objects 230 and 240 may be performed by an existing motion vector calculation technique. A detailed description for this will be omitted because of departing from embodiments of the inventive concept. Also, the controller set to the driving mode may estimate relative speeds of the objects 230 and 240 rather than calculating the motion vectors of the objects 230 and 240 and may detect the objects 230 and 240 enter the ROI 250.

For example, as shown in FIG. 2A, the objects 230 and 240 may not be located on the ROI 250 in the image 210 for a previous frame between the images 210 and 220 obtained from the rear camera. As shown in FIG. 2B, if the objects 230 and 240 are located on the ROI 250 in the image 220 for a current frame, the controller set to the driving mode may detect that the objects 230 and 240 are located on the ROI 250.

In detail, for one example, the controller set to the driving mode may recognize that appearance information or identification information associated with the first object 230 extracted from the image 210 for the previous frame is changed to appearance information or identification information associated with the first object 230 extracted from the image 220 for the current frame or may detect that the first object 230 enters the first ROI 251 or is traveling at the same speed as the vehicle on a first ROI 251 by calculating a motion vector of the first object 230 based on a difference between pixel blocks included in the first ROI 251 in the image 220 for the previous frame and the image 220 for the current frame.

For another example, the controller set to the driving mode may activate a function of detecting a second ROI 252 in the image 220 for the current frame and may detect that the second object 240 is located on the second ROI 252 using the HOG technique and the SVM technique based on appearance information or identification information associated with the second object 210. In this case, in case of using the HOG technique, the controller set to the driving mode may increase a calculation speed of the HOG technique by setting parameters used for the HOG technique to be optimized, based on appearance information previously constructed for each of a plurality of objects including the objects 230 and 240 (e.g., by setting parameters such as symmetry between the objects 230 and 240, angular distribution characteristics of edges for the objects 230 and 240, and an interval in which appearance characteristics of the objects 230 and 240 are intensively distributed).

The above-mentioned appearance information associated with the objects 230 and 240 may include appearance information (e.g., front appearance information or side appearance information) associated with a type and size of each of the objects 230 and 240 and information associated with a pose of each of the objects 230 and 240 as each of the objects 230 and 240 is traveling. Also, the identification information associated with the objects 230 and 240 may refer to a license plate of a vehicle, if each of the objects 230 and 240 is the vehicle. Hereinafter, an embodiment of the inventive concept is exemplified as each of the objects 230 and 240 is the vehicle. However, embodiments of the inventive concept are not limited thereto. For example, each of the objects 230 and 240 may be each of all objects, such as a person, a motorcycle, a bicycle, or a sign, which may crash the vehicle.

The ROI 250 may be a specific region on the images 210 and 220 for detecting the left lane area 211 or 221 and the right lane area 211 or 221 behind the vehicle from the images 210 and 220 obtained from the rear camera and may be adaptively adjusted by the controller set to the driving mode.

For example, the ROI 250 may be set in at least one of location, form, size, or number based on at least one of left lane information and right lane information detected from the images 210 and 220 obtained from the rear camera, location information of a vanishing point on the images 210 and 220 obtained from the rear camera, or appearance information of each of the objects 230 and 240 located on the images 210 and 220 obtained from the rear camera.

In detail, for example, the ROI 250 may have a rectangle shape which is longer left and right or a rectangle shape which is longer up and down, based on appearance information of each of the objects 230 and 240 located on the images 210 and 220 obtained from the rear camera. Herein, the appearance information of each of the objects 230 and 240 may include information about a shadow generated by each of the objects 230 and 240.

Also, the ROI 250 may be set in at least one of location, form, size, or number based on at least one of a speed calculated by the controller set to the driving mode or power consumed by the controller set to the driving mode.

For example, the ROI 250 may be adaptively set in the at least one of location, form, size, or number based on at least one of the HOG technique or the Haar-like feature technique used to extract a feature from each of the images 210 and 220 obtained from the rear camera or the SVM technique, the Adaboost technique, or the ANN technique used to identify the objects 230 and 240, in the process of detecting whether the objects 230 and 240 are located on the left lane area 211 or 221 and the right lane area 211 or 221 behind the vehicle.

In detail, for example, the ROI 250 may be set in the at least one of location, form, size, or number such that the controller set to the driving mode minimizes its calculation speed using the HOG technique.

In this case, as the ROI 250 is adaptively set in the at least one of location, form, size, or number, the controller set to the driving mode may detect only the left lane area 211 and the right lane area 221 behind the vehicle within a distance from the vehicle, rather than detecting all of left lane areas and right lane areas behind the vehicle. Therefore, the controller set to the driving mode may adjust power consumed to activating the function of detecting the ROI 250 by adaptively setting the ROI 250 in the at least one of location, form, size, or number.

As such, the controller set to the driving mode according to an exemplary embodiment of the inventive concept may detect whether each of the objects 230 and 240 is located on or enters the ROI 250 from the images 210 and 220 obtained from the rear camera and may notify a driver of the vehicle of the detected result using an alarm. For example, the controller set to the driving mode may notify the driver of the vehicle of the detected result using the alarm through at least one of a display device or an audio device installed in the vehicle.

Also, if detecting that each of the objects 230 and 240 is not located on or departs from the ROI 250, the controller set to the driving mode may notify the driver of the vehicle that the each of the objects 230 and 240 is not located on or departs from the ROI 250. In this case, if each of the objects 230 and 240 is located on the ROI 250, the controller set to the driving mode may recognize a change of appearance information or identification information associated with the objects 230 and 240 based on the function of detecting the activated ROI 250, or may detect whether each of the objects 230 and 240 departs from the ROI 250 by calculating a motion vector of each of the objects 230 and 240 based on the function of detecting the activated ROI 250.

Also, this notification operation may not be optionally performed based on a setting previously input from the driver of the vehicle (e.g., an operation of notifying the driver of the vehicle that each of the objects 230 and 240 is not located on the left lane area 211 or 221 and the right lane area 211 or 221 behind the vehicle may not be performed based on a setting).

Also, the controller set to the driving mode may classify the ROI 250 corresponding to the left lane area 211 or 221 and the right lane area 211 or 221 into a plurality of regions, may detect whether each of the objects 230 and 240 is located on or enters the plurality of regions, and may notify the driver of the detected result using the alarm. A detailed description for this will be described with reference to FIG. 3.

Figure 3:
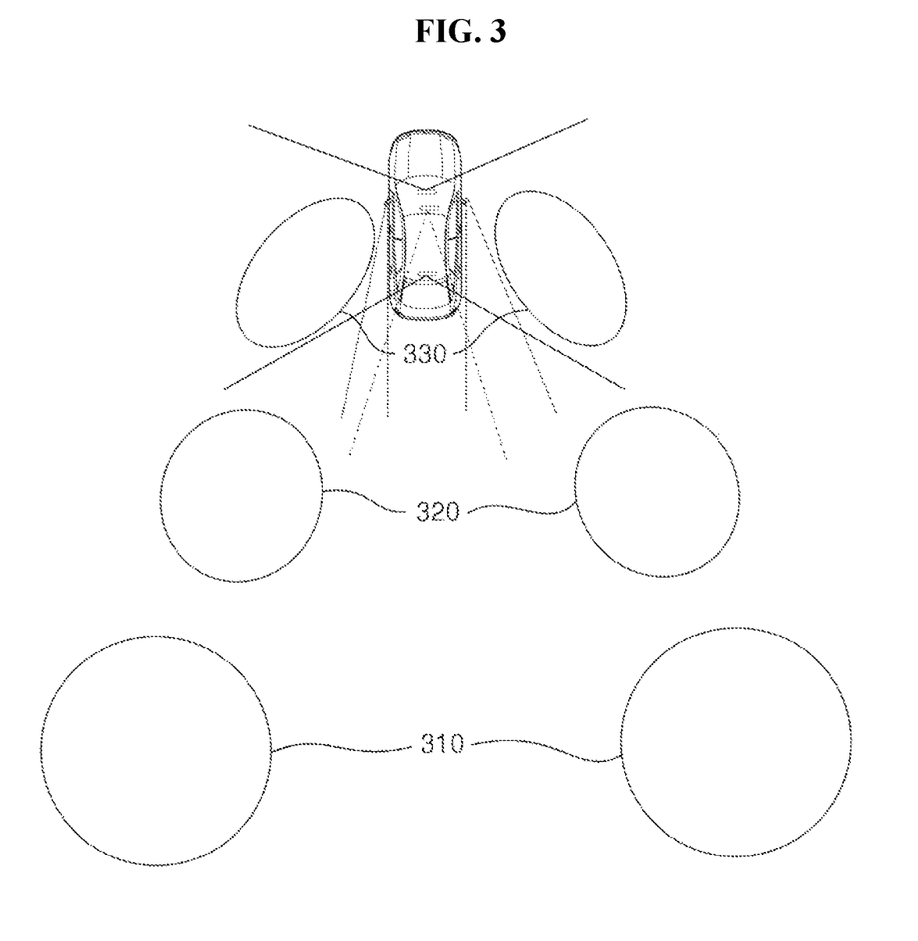
FIG. 3 is a drawing illustrating a left lane area and a right lane region behind a vehicle according to an exemplary embodiment of the inventive concept.

FIG. 3 is a drawing illustrating a left lane area and a right lane region behind a vehicle according to an exemplary embodiment of the inventive concept.

Referring to FIG. 3, a controller set to a driving mode according to an exemplary embodiment of the inventive concept may classify a left lane area and a right lane area behind a vehicle into a plurality of areas and may detect whether each of objects is located on or enters one of the plurality of classified areas.

Herein, the controller set to the driving mode may classify the left lane area and the right lane area behind the vehicle into a first area 310, a second area 320, and a third area 330 on ROIs of an image obtained from a rear camera, based on at least one of left lane information and right lane information detected from the image obtained from the rear camera or location information of a vanishing point on the image obtained from the rear camera.

Therefore, the controller set to the driving mode may detect whether the object is located on or enters one of the first area 310 of a distance or more from the vehicle, which is not recognized by a driver of the vehicle through side mirrors of the vehicle and is captured by the rear camera, the second area 320 of less than the distance from the vehicle, which is not recognized by the driver through the side mirrors and is captured by the rear camera, and the third area 330 which is not recognized by the driver through the side mirrors and is not captured by the rear camera.

For example, the controller set to the driving mode may use at least one of left lane information and right lane information detected from the image obtained from the rear camera or location information of the vanishing point on the image obtained from the rear camera in the process of detecting whether the object is located on or enters one of the first area 310, the second area 320, and the third area 330. In detail, for example, the controller set to the driving mode may determine whether the object is greater than or equal to a distance or is less than the distance in the ROI, based on the left lane information and the right lane information detected from the image obtained from the rear camera.

In this case, the controller set to the driving mode may detect whether the object is located on or enters one of the first area 310, the second area 320, and the third area 330 by activating a function of detecting the ROIs corresponding to a left lane area and a right lane area behind the vehicle from the image obtained from the rear camera.

In detail, the controller set to the driving mode may detect whether the object is located on one of the first area 310, the second area 320, and the third area 330 by extracting a feature from the ROIs using at least one of the HOG technique or the Haar-like feature technique based on the function of detecting the activated ROIs and identifying the object using at least one of the SVM technique, the Adaboost technique, or the ANN technique based on the function of detecting the activated ROIs.

For example, the controller set to the driving mode may previously store and maintain appearance information and identification information associated with each of a plurality of objects in a database. The controller set to the driving mode may detect whether the object is located on one of the first area 310 and the second area 320 by comparing appearance information or identification information of the object identified using the at least one of the SVM technique, the Adaboost technique, or the ANN technique with the appearance information or the identification information associated with each of the plurality of objects stored in the database based on the feature extracted from the ROIs using the at least one of the HOG technique or the Haar-like feature technique.

Also, the controller set to the driving mode may recognize a change of appearance information or identification information associated with each of the plurality of objects or may detect whether the object enters one of the first area 310, the second area 320, and the third area 330 or whether the object is traveling at the same speed as the vehicle on one of the first area 310, the second area 320, and the third area 330 by calculating a motion vector of each of the plurality of objects.

Particularly, since the third area 330 is not recognized by the driver through the side mirrors and is not captured by the rear camera, if the object is located on the second area 320, the controller set to the driving mode may recognize a change of appearance information or identification information of the object or may detect whether the object enters the third area 330 by calculating a motion vector of the object.

For example, after the object is located on the second area 320, if the calculated motion vector of the object goes towards the third area 330 (e.g., if the object disappear from the second area 320 on an ROI of an image for a current frame and enters the third area 330 as the motion vector of the object goes towards the third area 330 (i.e., the front of the second area 320) on an ROI of an image for a previous frame), the controller set to the driving mode may detect whether the object enters the third area 330.

In this case, the controller set to the driving mode may notify a driver of the vehicle of the detected result using a distinguishing alarm based on an area the object is located on or enters among the first area 310, the second area 320, and the third area 330. For example, if detecting that the object enters the third area 330, the controller set to the driving mode may notify the driver of the detected result using a more urgent and higher alarm sound than if the object is located on or enters the first area 310 or the second area 320.

Also, after detecting that the object enters the third area 330 and notifying the driver of the detected result using the alarm, if an alarm time elapses or if detecting that the object departs from the third area 330, the controller set to the driving mode may clear the alarm.

For example, after detecting that the object enters the third area 330 and notifying the driver of the detected result using the alarm, if detecting that the object departs from the third area 330 using an image obtained from a front camera or an image obtained from the rear camera, the controller set to the driving mode may clear the alarm notified to the driver. In this case, since the object enters the third area 330 through the second area 320, the controller set to the driving mode may detect that the object departs from the third area 330 by determining whether there is an object matched to appearance information or identification information on the image obtained from the front camera or the image obtained from the rear camera, based on appearance information or identification information associated with the object extracted from the image obtained from the rear camera when the object is located on the second area 320.

In detail, for example, if the object enters the third area 330 through the second area 320 and then moves to the front of the vehicle, the controller set to the driving mode may temporarily store the appearance information or the identification information associated with the object extracted when the object is located on the second area 320, may determine that there is an object matched to the temporarily stored appearance information or identification information on an image obtained from the front camera, and may detect that the corresponding object departs from the third area 330.

As such, the controller set to the driving mode may notify the driver of a result of detecting an object located on ROIs corresponding to a left lane area and a right lane area behind the vehicle using an alarm based on a risk by classifying the left lane area and the right lane area behind the vehicle into the first area 310, the second area 320, and the third area 330 and detecting whether the object is located on or enters one of the first area 310, the second area 320, and the third area 330.

Also, only if the object approaches the ROIs corresponding to the left lane area and the right lane area behind the vehicle at a faster speed than the vehicle, the controller set to the driving mode may optionally detect the object. For example, as the vehicle is traveling at a faster speed than the object, if the object is located or enters the ROIs corresponding to the left lane area and the right lane area behind the vehicle, the controller set to the driving mode may not perform the process of detecting the object and notifying the driver of the detected result using the alarm. A detailed description for this will be described with reference to FIGS. 4A and 4B.

Figure 4A:
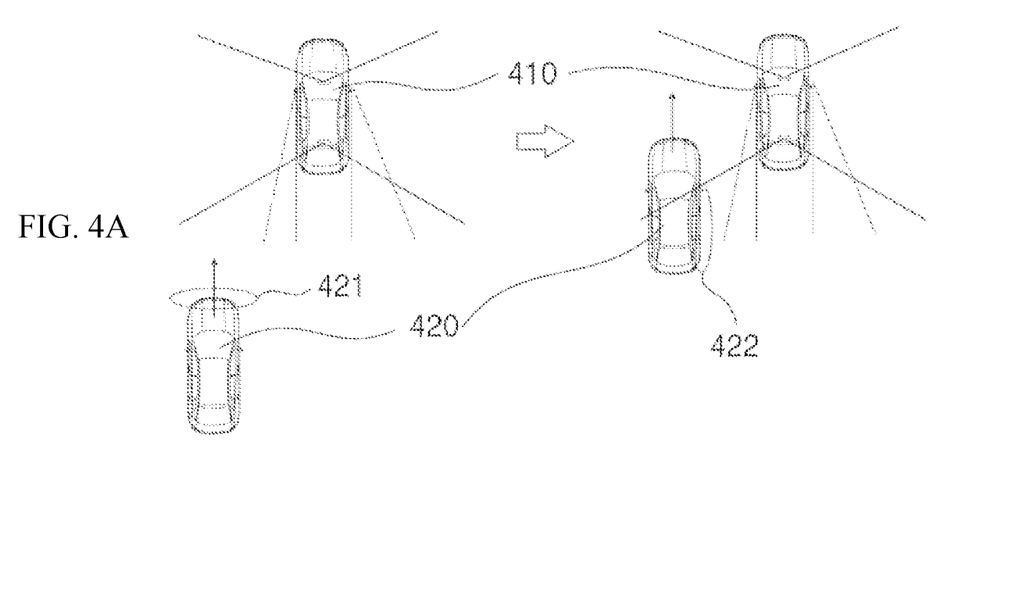
FIGS. 4A and 4B are drawings illustrating a method for detecting a left lane area and a right lane area behind a vehicle using an ROI according to an exemplary embodiment of the inventive concept.
Figure 4B:
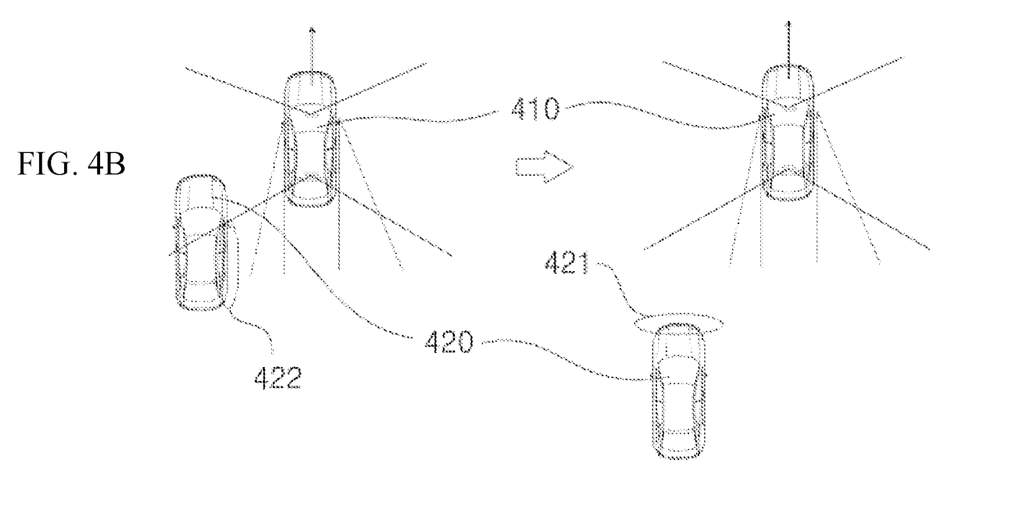

FIGS. 4A and 4B are drawings illustrating a method for detecting a left lane area and a right lane area behind a vehicle using an ROI according to an exemplary embodiment of the inventive concept.

Referring to FIGS. 4A and 4B, only if an object 420 approaches an ROI corresponding to a left lane area behind a vehicle 410 at a faster speed than the vehicle 410, a controller set to a driving mode according to an exemplary embodiment of the inventive concept may optionally detect the object 420.

In detail, the controller set to the driving mode may recognize a change of appearance information or identification information of the object 420 extracted from an ROI of an image obtained from a rear camera, or may optionally detect the object 420 only if the object 420 approaches the ROI corresponding to the left lane area behind the vehicle 410 at a faster speed than the vehicle 410 by calculating a motion vector of the object 420 and may notify a driver of the vehicle 410 of the detected result using an alarm.

For example, as shown in FIG. 4A, if the object 420 approaches the ROI corresponding to the left lane area behind the vehicle 410 at a faster speed than the vehicle 410, the appearance information of the object 420 extracted from the ROI of the image obtained from the rear camera may be changed in an order from front appearance information 421 to side appearance information 422. In contrast, as shown in FIG. 4B, as the vehicle 410 is traveling at a faster speed than the object 420, if the object 420 is located on the ROI corresponding to the left lane area behind the vehicle 410, appearance information of the object 420 extracted from the ROI of the image obtained from the rear camera may be changed in an order from the side appearance information 422 to the front appearance information 421.

Therefore, the controller set to the driving mode may optionally detect the object 420 only if the object 420 approaches the ROI corresponding to the left lane area behind the vehicle 410 at a faster speed than the vehicle 410 by optionally detecting the object 420 only if the appearance information associated with the object 420 extracted from the ROI of the image obtained from the rear camera is changed in the order from the front appearance information 421 to the side appearance information 422.

Also, the controller set to the driving mode may optionally notify the driver of the vehicle 410 of the detected result, rather than optionally detecting the object 420. In this case, the controller set to the driving mode may detect the object 420 and may optionally notify the driver of the detected result using an alarm based on a change of appearance information associated with the detected object 420. For example, the controller set to the driving mode may optionally notify the driver of the detected result, only if the appearance information associated with the detected object 420 is changed from the front appearance information 421 to the side appearance information 422.

Figure 5:
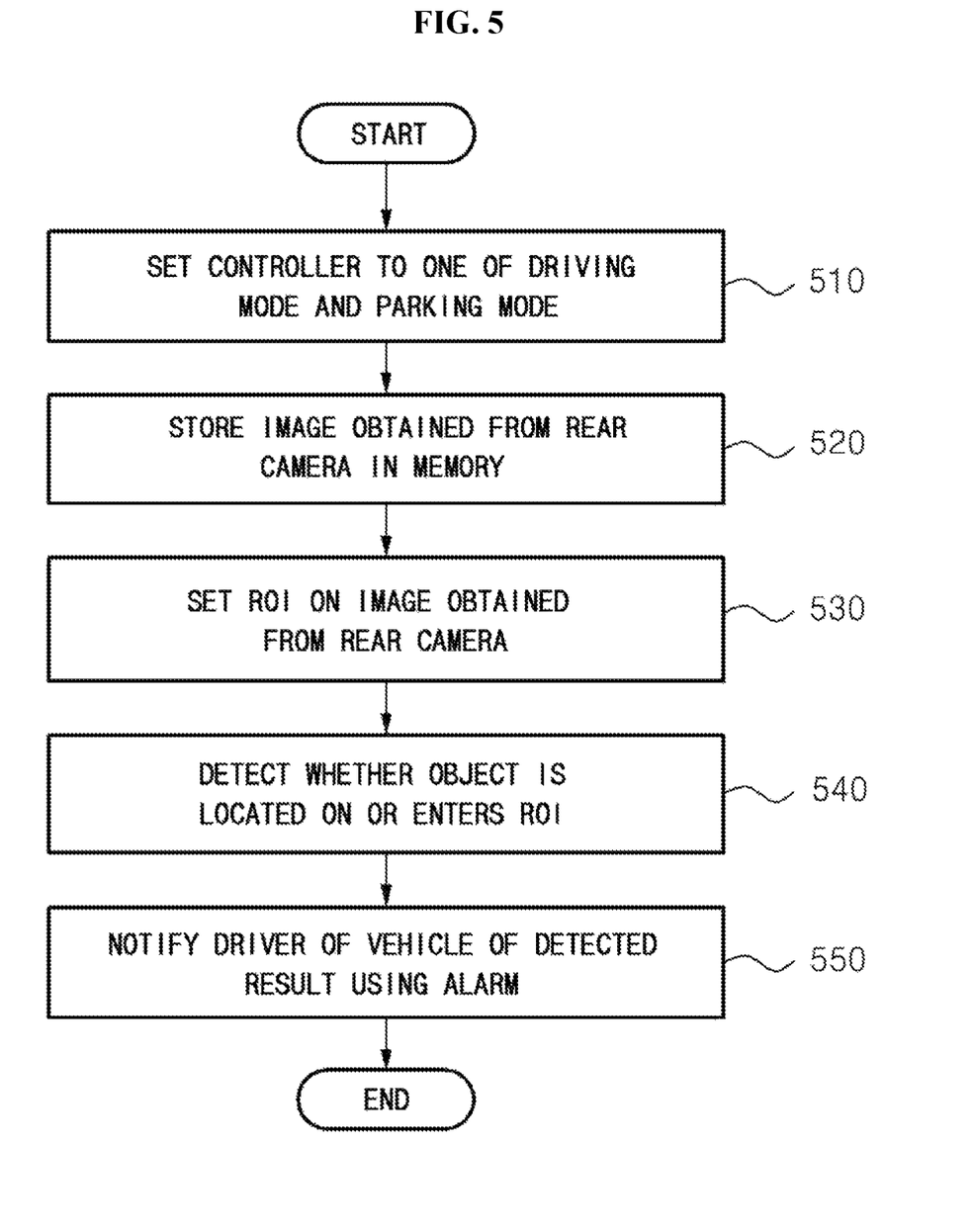
FIG. 5 is a flowchart illustrating a method for detecting a left lane area and a right lane area behind a vehicle using an ROI according to an exemplary embodiment of the inventive concept.

FIG. 5 is a flowchart illustrating a method for detecting a left lane area and a right lane area behind a vehicle using an ROI according to an exemplary embodiment of the inventive concept.

Referring to FIG. 5, in step 510, an image monitoring system for vehicle according to an exemplary embodiment of the inventive concept may set a controller to one of a driving mode and a parking mode based on whether a vehicle is traveling.

In this case, if the controller is set to the driving mode, the image monitoring system for vehicle may control a rear camera to obtain a high-quality image of an image quality or more, using the controller set to the driving mode. Also, the controller may control a front camera included in the image monitoring system for vehicle to obtain a high-quality image of an image quality or more.

In contrast, if the controller is set to the parking mode, the image monitoring system for vehicle may control the rear camera to obtain a low-quality image of less than the image quality, using the controller set to the parking mode. Also, the controller may control the front camera to obtain a low-quality image of less than an image quality.

In step 520, the image monitoring system for vehicle may store an image obtained from the rear camera in its memory.

The image monitoring system for vehicle may detect an event from the image obtained from the rear camera, using the controller. Herein, the image monitoring system for vehicle may use the image obtained from the rear camera, stored in the memory. A typical event detection technique may be used for the operation of detecting the event from the image obtained from this rear camera. Also, the image monitoring system for vehicle may detect an event from the image obtained from the front camera.

In this case, in step 530, the image monitoring system for vehicle may set an ROI on the image obtained from the rear camera, while the vehicle is traveling, using the controller set to the driving mode. For example, the image monitoring system for vehicle may set an ROI based on left lane information and right lane information detected from the image obtained from the rear camera. In detail, for example, the image monitoring system for vehicle may calculate blind spots of side mirrors and a rearview mirror of the vehicle between a left lane area and a right lane area behind the vehicle and may set a region including the calculated blind spots to an ROI. Also, the image monitoring system for vehicle may determine an ROI in at least one of location, form, size, or number using shadow information of an object.

In step 540, the image monitoring system for vehicle may detect whether the object is located on or enters ROIs corresponding to the left lane area and the right lane area of the vehicle, using the controller set to the driving mode. For example, the image monitoring system for vehicle may detect whether the object is located on or enters the ROIs corresponding to the left lane area and the right lane area behind the vehicle from the image obtained from the rear camera for each frame or at intervals of a time, while the vehicle is traveling.

In detail, the image monitoring system for vehicle may detect whether the object is located on or enter an ROI of the image obtained from the rear camera by activating a function of detecting the ROIs corresponding to the left lane area and the right lane area behind the vehicle from the image obtained from the rear camera, using the controller set to the driving mode. A detailed description for this will be described with reference to FIG. 6.

Herein, an ROI which is a region fixed to at least part of the left lane area and the right lane area behind from the vehicle may be set in at least one of location, form, size, or number based on at least one of left lane information and right lane information detected from the image obtained from the rear camera, location information of a vanishing point on the image obtained from the rear camera, appearance information of an object located on the image obtained from the rear camera, a speed calculated by the controller, or power consumed by the controller. As such, the process of setting the ROI in the at least one of location, form, size, or number may be performed in step 530.

In step 550, the image monitoring system for vehicle may notify the driver of the vehicle of the detected result using an alarm. For example, the image monitoring system for vehicle may notify the driver of the vehicle of the detected result through at least one of a display device or an audio device installed in the vehicle. This notification operation may be adaptively performed based on a setting of the vehicle.

Figure 6:
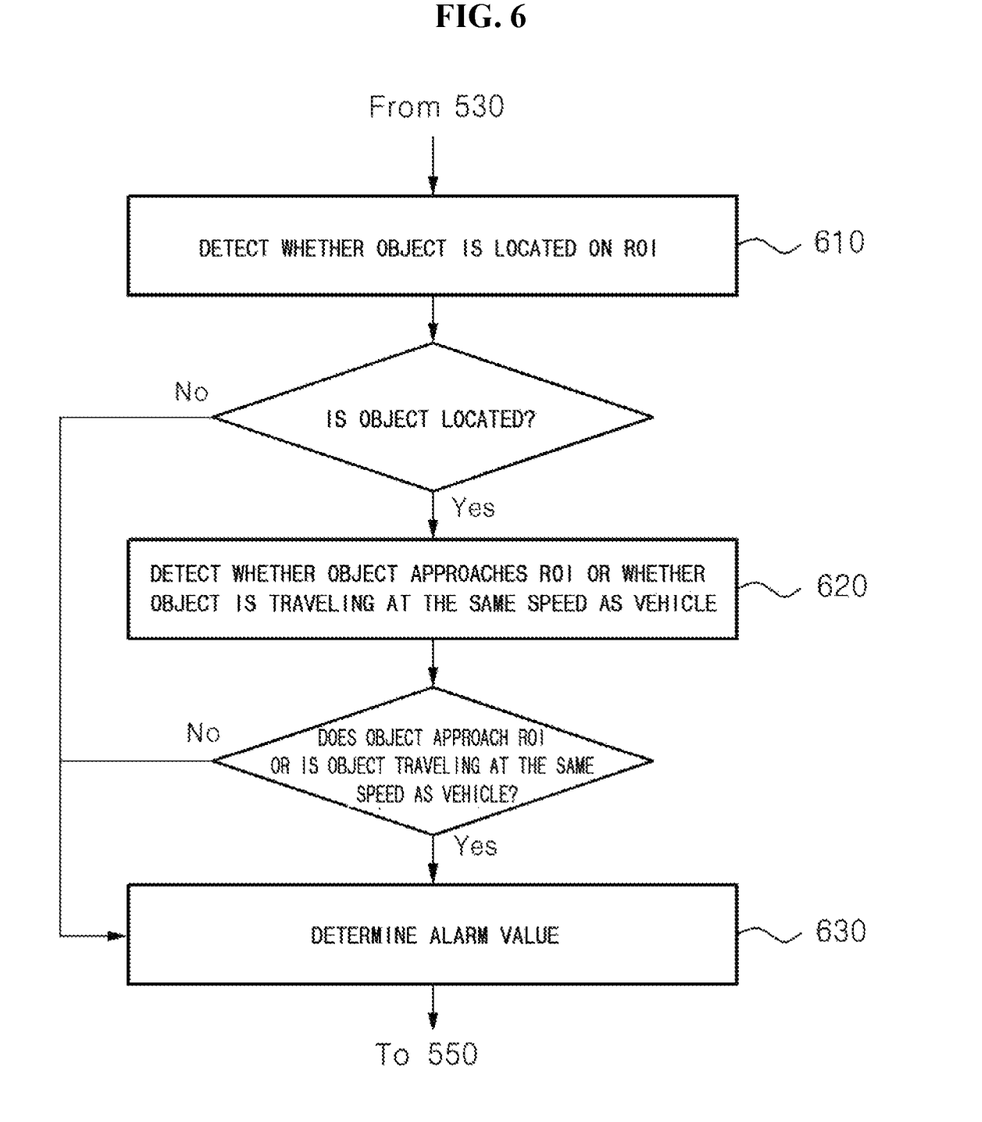
FIG. 6 is a flowchart illustrating a process of detecting whether an object is located on or enters an ROI described with reference to FIG. 5 according to an exemplary embodiment of the inventive concept.

FIG. 6 is a flowchart illustrating a detailed process of detecting whether an object is located on or enters an ROI described with reference to FIG. 5 according to an exemplary embodiment of the inventive concept.

Referring to FIG. 6, in step 610, an image monitoring system for vehicle may detect whether an object is located on an ROI by extracting a feature from the ROI using at least one of the HOG technique or the Haar-like feature technique based on a function of detecting an activated ROI and identifying an object using at least one of the SVM technique, the Adaboost technique, or the ANN technique based on a function of detecting an activated ROI.

In this case, in case of using the HOG technique, the image monitoring system for vehicle may set parameters used for the HOG technique based on appearance information previously constructed for each of a plurality of objects including the object.

Also, the image monitoring system for vehicle may detect whether the object is located on the ROI by recognizing a change of appearance information or identification information of the object based on the function of detecting the activated ROI or detecting whether the object enters the ROI or whether the object is traveling at the same speed as a vehicle on the ROI by calculating a motion vector of the object based on the function of detecting the activated ROI.

Also, in step 620, if the object is located on the ROI as a result of detecting whether the object is located on the ROI, the image monitoring system for vehicle may recognize a change of appearance information or identification information of the object based on the function of detecting the activated ROI or may detect whether the object approaches the ROI within a range with respect to the vehicle or whether the object is traveling at the same speed as the vehicle within a range with respect to the vehicle by calculating a motion vector of the object based on the function of detecting the activated ROI.

In step 630, if the object approaches the ROI or if the object is traveling at the same speed as the vehicle within the range with respect to the vehicle as a result of the detecting whether the object approaches the ROI or whether the object is traveling at the same speed as the vehicle within the range with respect to the vehicle, the image monitoring system for vehicle may determine an alarm value to be notified to a driver of the vehicle. For example, if the object is located on the ROI as a result of detecting whether the object is located on the ROI, and if the object approaches the ROI or if the object is traveling at the same speed as the vehicle within the range with respect to the vehicle as a result of detecting whether the object approaches the ROI or whether the object is traveling at the same speed as the vehicle within the range with respect to the vehicle, an alarm value notified to drivers of all vehicles may be determined as "1" which is a true value.

In contrast, if the object is not located on the ROI as a result of detecting whether the object is located on the ROI, and if the object does not approach the ROI or if the object is not traveling at the same speed as the vehicle within the range with respect to the vehicle as a result of detecting whether the object approaches the ROI or whether the object is traveling at the same speed as the vehicle within the range with respect to the vehicle, an alarm value notified to the drivers of all the vehicles may be determined as "0" which is a false value.

Therefore, the image monitoring system for vehicle may notify the driver of the vehicle of the detected result using an alarm based on the detected alarm value.

Also, although not shown, the image monitoring system for vehicle may detect whether the object is located on or enter one of a first area of a distance or more from the vehicle, which is not recognized by the driver through side mirrors of the vehicle on the ROI of the image obtained from the rear camera and which is captured by the rear camera, a second area of less than the distance, which is not recognized by the driver through the side mirrors and is captured by the rear camera, or a third area which is not recognized by the driver through the side mirrors and is not captured by the rear camera.

For example, if the object is located on the second area in the ROI, the image monitoring system for vehicle may recognize a change of appearance information or identification information of the object, or may detect whether the object enters the third area by calculating a motion vector of the object.

Also, after detecting that the object is located on the third area and notifying the driver of the vehicle of the detected result using the alarm, if an alarm time elapses or if detecting that the object departs from the third area, the image monitoring system for vehicle may clear the alarm In this case, the image monitoring system for vehicle may detect that the object departs from the third area, using an image obtained from its front camera or an image obtained from the rear camera.

As such, since the method for detecting the left lane area and the right lane area behind the vehicle uses the image monitoring system for vehicle, it may be easily performed in the vehicle where the image monitoring system for vehicle is installed.

Figure 7:
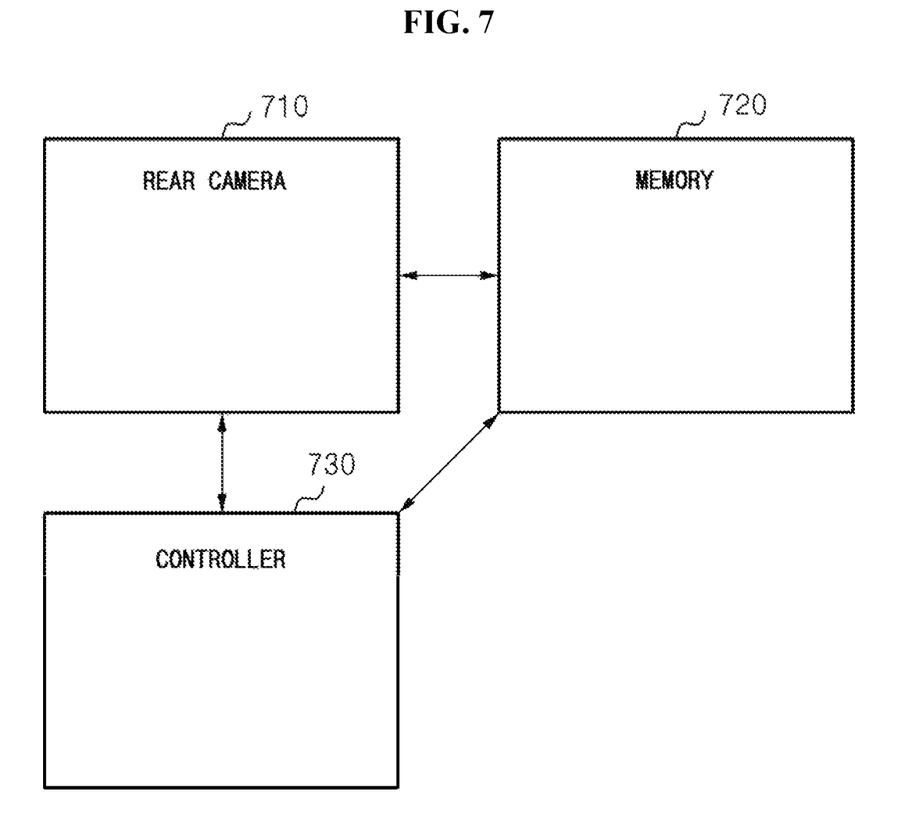
FIG. 7 is a block diagram illustrating a configuration of an image monitoring system for vehicle according to an exemplary embodiment of the inventive concept.

FIG. 7 is a block diagram illustrating a configuration of an image monitoring system for vehicle according to an exemplary embodiment of the inventive concept.

Referring to FIG. 7, the image monitoring system for vehicle according to an exemplary embodiment of the inventive concept may include a rear camera 710, a memory 720, and a controller 730.

The rear camera 710 may obtain an image based on an angle preset towards the rear of a vehicle.

The memory 720 may store the image obtained from the rear camera 710.

The controller 730 may be set to one of a driving mode and a parking mode based on whether the vehicle is traveling and may detect an event from the image obtained from the rear camera 710.

Herein, although not illustrated, the image monitoring system for vehicle may further include a front camera which obtains an image based on an angle preset towards the front of the vehicle. Therefore, the memory 720 may store the image obtained from the front camera. The controller 730 may detect an event from the image obtained from the front camera.

In this case, the controller 730 set to the driving mode may set ROIs corresponding to a left lane area and a right lane area behind the vehicle on the image obtained from the rear camera 710, while the vehicle is traveling, and detect whether an object is located on or enters the ROIs. For example, the controller 730 set to the driving mode may detect whether the object is located on or enters the ROIs from the image obtained from the rear camera 710 for each frame or at intervals of a time, while the vehicle is traveling.

Particularly, the controller 730 set to the driving mode may detect whether the object is located on or enter the ROIs from the image obtained from the rear camera 710 by activating a function of detecting the ROIs corresponding to the left lane area and the right lane area behind the vehicle from the image obtained from the rear camera 710.

Herein, the controller 730 set to the driving mode may set an ROI based on left lane information and right lane information detected from the image obtained from the rear camera 710. For example, the controller 730 set to the driving mode may calculate blind spots of side mirrors and a rearview mirror of the vehicle between a left lane area and a right lane area behind the vehicle based on the left lane information and the right lane information detected from the image obtained from the rear camera 710 and location information of a vanishing point on the image obtained from the rear camera 710 and may set a region including the calculated blind spots to an ROI.

Also, the controller 730 set to the driving mode may determine the ROI in at least one of location, form, size, or number using shadow information of the object. For example, the ROI may be set in the at least one of location, form, size, or number based on at least one of the left lane information and the right lane information detected from the image obtained from the rear camera 710, the location information of the vanishing point on the image obtained from the rear camera 710, appearance information of an object located on the image obtained from the rear camera 710, a speed calculated by the controller, or power consumed by the controller 730. As such, the process of setting the ROI in the at least one of location, form, size, or number may be performed in the process of setting the ROI at the controller 730 set to the driving mode.

Also, the controller 730 set to the driving mode may notify a driver of the vehicle of the detected result using an alarm. For example, the controller 730 set to the driving mode may notify the driver of the vehicle of the detected result through at least one of a display device or an audio device installed in the vehicle. This notification operation may be adaptively performed based on a setting of the vehicle.

The operation of the controller 730 set to the driving mode, which detects whether the object is located on or enters the ROI of the image obtained from the rear camera 710, will be described in detail hereinafter.

In detail, the controller 730 set to the driving mode may detect whether the object is located on the ROI by extracting a feature from the ROI using at least one of the HOG technique or the Haar-like feature based on a function of detecting an activated ROI and identifying an object using at least one of the SVM technique, the Adaboost technique or an ANN technique based on the function of detecting the activated ROI.

Herein, in case of using the HOG technique, the controller 730 set to the driving mode may set parameters used for the HOG technique based on appearance information previously constructed for each of a plurality of objects including the object.

In this case, the controller 730 set to the driving mode may detect whether the object is located on the ROI by recognizing a change of appearance information or identification information of the object based on the function of detecting the activated ROI or detecting whether the object enters the ROI or whether the object is traveling at the same speed as the vehicle on the ROI by calculating a motion vector of the object based on the function of detecting the activated ROI.

Also, if the object is located on the ROI as a result of detecting whether the object is located on the ROI, the controller 730 set to the driving mode may recognize a change of appearance information or identification information of the object based on the function of detecting the activated ROI or may detect whether the object approaches the ROI within a range with respect to the vehicle or whether the object is traveling at the same speed as the vehicle within the range with respect to the vehicle by calculating a motion vector of the object based on the function of detecting the activated ROI.

If the object approaches the ROI or if the object is traveling at the same speed as the vehicle within the range with respect to the vehicle as a result of detecting whether the object approaches the ROI or whether the object is traveling at the same speed as the vehicle within the range with respect to the vehicle, the controller 730 set to the driving mode may determine an alarm value to be notified to a driver of the vehicle. For example, if the object is located on the ROI as a result of detecting whether the object is located on the ROI, and if the object approaches the ROI or if the object is traveling at the same speed as the vehicle within the range with respect to the vehicle as a result of detecting whether the object approaches the ROI or whether the object is traveling at the same speed as the vehicle within the range with respect to the vehicle, an alarm value to be notified to drivers of all vehicles may be determined as "1" which is a true value.

In contrast, if the object is not located on the ROI as a result of detecting whether the object is located on the ROI, and if the object does not approach the ROI or if the object is not traveling at the same speed as the vehicle within the range with respect to the vehicle as a result of detecting whether the object approaches the ROI or whether the object is traveling at the same speed as the vehicle within the range with respect to the vehicle, an alarm value to be notified to the drivers of all the vehicles may be determined as "0" which is a false value.

Therefore, the controller 730 set to the driving mode may notify the driver of the vehicle of the detected result using an alarm based on the determined alarm value.

Also, the controller 730 set to the driving mode may detect whether the object is located on or enters one of a first area of a distance or more from the vehicle, which is not recognized by the driver through side mirrors of the vehicle on an ROI of an image obtained from the rear camera 710 and is captured by the rear camera 710, a second area of less than the distance from the vehicle, which is not recognized by the driver through the side mirrors and is captured by the rear camera 710, or a third area which is not recognized by the driver through the side mirrors and is not captured by the rear camera 710, based on the function of detecting the activated ROI.

For example, if the object is located on the second area, the controller 730 set to the driving mode may recognize a change of appearance information or identification information of the object, or may detect whether the object enters the third area by calculating a motion vector of the object.

Also, after detecting that the object is located on the third area and notifying the driver of the vehicle of the detected result using the alarm, if an alarm time elapses or if detecting that the object departs from the third area, the controller 730 set to the driving mode may clear the alarm In this case, the controller 730 set to the driving mode may detect that the object departs from the third area, using an image obtained from the front camera or an image obtained from the rear camera 710.

Also, the controller 730 set to the driving mode may control each of the front camera and the rear camera 710 to obtain a high-quality image of an image quality or more.

In contrast, the controller 730 set to the driving mode may control each of the front camera and the rear camera 710 to obtain a low-quality image of less than the image quality.

According to embodiments of the inventive concept, the image monitoring system for vehicle, installed in the vehicle, may detect whether the object is located on or enters ROIs corresponding to a left lane area and a right lane area behind the vehicle, from the image obtained from the rear camera included in the image monitoring system for vehicle.

Therefore, according to embodiments of the inventive concept, the image monitoring system for vehicle may remarkably reduce an amount of calculation for detecting the object by detecting the object on only the ROI for at least part of the left lane area and the right lane area behind the vehicle, rather than detecting the object on a portion corresponding to the entire area behind the vehicle from the image obtained from the rear camera.

Also, according to embodiments of the inventive concept, the image monitoring system for vehicle may be implemented as a low-priced device because of using the technique in which an amount of calculation for detecting the object is reduced.

Also, according to embodiments of the inventive concept, the image monitoring system for vehicle may detect whether the object is located on the ROI by extracting a feature from the ROI using various feature extraction techniques and identifying the object using various object identification techniques.

Also, according to embodiments of the inventive concept, the image monitoring system for vehicle may recognize a change of appearance information or identification information of the object or may detect whether the object enters the ROI by estimating a motion vector of the object.

According to embodiments of the inventive concept, the image monitoring system for vehicle may optionally perform operations of detecting whether the object is located on or enters the ROI.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image monitoring system for vehicle for detecting a left lane area and a right lane area behind a vehicle using a region of interest (ROI), the system comprising:
    a rear camera;
    a memory configured to store an image obtained from the rear camera; and
    a controller configured to be set to one of a driving mode and a parking mode based on whether the vehicle is traveling and to detect an event from the image obtained from the rear camera,
    wherein the controller set to the driving mode sets the ROI corresponding to the left lane area and the right lane area behind the vehicle on the image obtained from the rear camera, while the vehicle is traveling, detects whether an object is located on or enters the ROI, and notifies a driver of the vehicle of the detected result using an alarm,
    wherein the controller does not set the ROI if a shadow of the object is not found from the image obtained from the rear camera,
    wherein the controller set to the driving mode sets the ROI based on left lane information and right lane information detected from the image obtained from the rear camera if the shadow of the object is found from the image obtained from the rear camera,
    wherein the controller set to the driving mode determines the ROI in at least one of location, form, size, or number using shadow information of the object,
    wherein the controller set to the driving mode calculates blind spots of side mirrors and a room mirror of the vehicle between the left lane area and the right lane area behind the vehicle based on the left lane information and the right lane information detected from the image obtained from the rear camera and location information of a vanishing point on the image obtained from the rear camera and sets a region including the calculated blind spots to the ROI.

2. The system of claim 1, wherein the controller set to the driving mode detects whether the object is located on the ROI by extracting a feature from the ROI using at least one of a histogram of gradients (HOG) technique or an Haar-like feature technique and identifying the object using at least one of a support vector machine (SVM) technique, an Adaboost technique, or an artificial neural network (ANN) technique.

3. The system of claim 2, wherein the controller set to the driving mode sets parameters used for the HOG technique based on appearance information previously constructed for each of a plurality of objects including the object, if using the HOG technique.

4. The system of claim 1, wherein the controller set to the driving mode recognizes a change of appearance information or identification information of the object, or detects whether the object enters the ROI or whether the object is traveling at the same speed as the vehicle on the ROI by calculating a motion vector of the object.

5. The system of claim 4, wherein the controller set to the driving mode recognizes the change of the appearance information or the identification information of the object or detects whether the object departs from the ROI by calculating the motion vector of the object, if the object is located on the ROI.

6. The system of claim 1, wherein the controller set to the driving mode detects whether the object is located on or enters one of a first area of a distance or more from the vehicle, which is not recognized by the driver through side mirrors of the vehicle and is captured by the rear camera, a second area of less than the distance from the vehicle, which is not recognized by the driver through the side mirrors and is captured by the rear camera, or a third area which is not recognized by the driver through the side mirrors and is not captured by the rear camera.

7. The system of claim 6, wherein the controller set to the driving mode recognizes a change of appearance information or identification information of the object or detects whether the object enters the third area by calculating a motion vector of the object, if the object is located on the second area in the ROI.

8. The system of claim 7, wherein, after detecting that the object enters the third area and notifying the driver of the vehicle of the detected result using the alarm, the controller set to the driving mode clears the alarm, if detecting that the object departs from the third area.

9. The system of claim 8, wherein the controller set to the driving mode detects that the object departs from the third area, using an image obtained from a front camera included in the image monitoring system for vehicle or the image obtained from the rear camera.

10. The system of claim 1, wherein the ROI is set in at least one of location, form, size, or number based on at least one of left lane information and right lane information detected from the image obtained from the rear camera, location information of a vanishing point on the image obtained from the rear camera, appearance information of the object located on the image obtained from the rear camera, a speed calculated by the controller, or power consumed by the controller.

11. The system of claim 1, wherein the controller set to the driving mode detects whether the object is located on or enters the ROI for each frame or at intervals of a time, while the vehicle is traveling.

12. The system of claim 1, wherein the controller set to the driving mode notifies the driver of the vehicle of the detected result using the alarm through at least one of a display device or an audio device installed in the vehicle.

* * * * *